United States Patent
Goyal et al.

(10) Patent No.: US 9,009,706 B1
(45) Date of Patent: Apr. 14, 2015

(54) MONITORING AND UPDATING STATE INFORMATION OF VIRTUAL DEVICES TO GUEST VIRTUAL MACHINES BASED ON GUEST VIRTUAL MACHINE'S PROBING POLICY

(71) Applicant: Symantec Corporation, Mountain View, CA (US)

(72) Inventors: Shweta Goyal, Pune (IN); Niranjan Pendharkar, Pune (IN)

(73) Assignee: Symantec Corporation, Mountain View, CA (US)

(*) Notice: Subject to any disclaimer, the term of this patent is extended or adjusted under 35 U.S.C. 154(b) by 271 days.

(21) Appl. No.: 13/748,556

(22) Filed: Jan. 23, 2013

(51) Int. Cl.
- G06F 9/455 (2006.01)
- G06F 11/07 (2006.01)
- G06F 11/30 (2006.01)

(52) U.S. Cl.
CPC .................................. *G06F 9/45545* (2013.01)

(58) Field of Classification Search
None
See application file for complete search history.

(56) References Cited

U.S. PATENT DOCUMENTS

| | | | |
|---|---|---|---|
| 2003/0163457 A1* | 8/2003 | Yano et al. | 707/3 |
| 2007/0050770 A1* | 3/2007 | Geisinger | 718/100 |
| 2008/0263407 A1* | 10/2008 | Yamamoto | 714/44 |
| 2009/0248949 A1* | 10/2009 | Khatri et al. | 711/6 |
| 2009/0307689 A1* | 12/2009 | Sudhakar | 718/1 |
| 2010/0262974 A1* | 10/2010 | Uyeda | 718/105 |
| 2010/0318990 A1* | 12/2010 | Hou et al. | 718/1 |
| 2010/0325191 A1* | 12/2010 | Jung et al. | 709/202 |
| 2011/0004791 A1* | 1/2011 | Kokubu et al. | 714/57 |
| 2011/0107148 A1* | 5/2011 | Franklin | 714/37 |
| 2011/0302577 A1* | 12/2011 | Reuther et al. | 718/1 |
| 2013/0055261 A1* | 2/2013 | Han et al. | 718/1 |
| 2013/0132949 A1* | 5/2013 | Tsirkin | 718/1 |
| 2013/0151908 A1* | 6/2013 | Iwanaga et al. | 714/48 |
| 2014/0181810 A1* | 6/2014 | Lvovsky et al. | 718/1 |

\* cited by examiner

*Primary Examiner* — Emerson Puente
*Assistant Examiner* — Benjamin Wu
(74) *Attorney, Agent, or Firm* — ALG Intellectual Property, LLC (57) ABSTRACT

A computer-implemented method for sending information to guest systems within virtual machines may include receiving, from a guest system within a virtual machine hosted on a host system, a request for virtual device information about a virtual device which may inaccurately represent to the guest system a state of a physical storage device connected to the host system, gathering physical device information via the host system about the physical storage device connected to the host system, determining a mapping of the virtual device within the guest system to the physical storage device connected to the host system, correlating the physical device information with the mapping to determine accurate information about the virtual device and sending the accurate information about the virtual device from the host system to the guest system within the virtual machine. Various other methods, systems, and computer-readable media are also disclosed.

18 Claims, 7 Drawing Sheets

MONITORING AND UPDATING STATE INFORMATION OF VIRTUAL DEVICES TO GUEST VIRTUAL MACHINES BASED ON GUEST VIRTUAL MACHINE'S PROBING POLICY

BACKGROUND

Virtualization is a widely-used technology with many advantages. One physical machine can host many different virtual machines, allowing users access to several operating systems at once. Virtual machines can be effectively sandboxed, preventing errors from affecting the rest of the system. Virtual memory systems make complicated remote storage schemes easier to understand. Virtual machines may also facilitate the efficient use of underlying physical resources and/or facilitate the efficient reconfiguration of computing resources with minimal disruption. With the growing popularity of cloud computing, even more applications are making use of some kind of virtualization.

Unfortunately, some of the very features that make virtualization an effective technique may also carry drawbacks. Because guest systems within virtual machines do not have direct access to physical devices, these physical devices may be misrepresented to the guest system. Inaccurate information about physical devices may lead to guest systems making incorrect decisions, causing otherwise avoidable errors and/or inefficiencies. Accordingly, the instant disclosure identifies and addresses a need for additional and improved systems and methods for sending information to guest systems within virtual machines.

SUMMARY

As will be described in greater detail below, the instant disclosure generally relates to systems and methods for sending information to guest systems within virtual machines by gathering physical information device via the host system and sending it to the guest system within the virtual machine.

In one example, a computer-implemented method for sending information to guest systems within virtual machines may include (1) receiving, from a guest system within a virtual machine hosted on a host system, a request for virtual device information about a virtual device which may inaccurately represent to the guest system a state of a physical storage device connected to the host system, (2) gathering physical device information via the host system about the physical storage device connected to the host system, (3) determining a mapping of the virtual device within the guest system to the physical storage device connected to the host system, (4) correlating the physical device information with the mapping to determine accurate information about the virtual device and (5) sending the accurate information about the virtual device from the host system to the guest system within the virtual machine.

In one embodiment, the accurate information about the virtual device may indicate a connectivity problem between the guest system and the physical storage device.

In one embodiment, the computer-implemented method may include moving, in response to the connectivity problem, the guest system to a different host system connected to the physical storage device that may not have the connectivity problem.

In one embodiment, the computer-implemented method may include receiving, in response to sending the accurate information, a request from the guest system requesting that the guest system be moved to a different host system connected to the physical storage device which may not have the connectivity problem.

In one embodiment, the accurate information about the virtual device may indicate a media failure of the physical storage device.

In one embodiment, the computer-implemented method may include moving, in response to the media failure, the guest system to a different host system connected to a different physical storage device which may replicate the physical storage device affected by the media failure.

In one embodiment, the physical device information about the physical storage device may include at least one of: (1) a media type of the physical storage device, (2) a logical unit type provided by the physical storage device, (3) a native capability of the physical storage device and/or (4) path availability information about a connection between the physical storage device and the guest system.

In one embodiment, receiving the request for virtual device information may include receiving a probing policy from the guest system that may configure the host to periodically gather updated information about the physical storage device and/or gathering the physical device information may include gathering the physical device information according to the probing policy.

In one embodiment, the virtual device may inaccurately represent the state of the physical storage device by representing an input/output path to the physical storage device as available when the input/output path to the physical storage device may be unavailable.

In one embodiment, a system for implementing the above-described method may include (1) a receiving module programmed to receive, from a guest system within a virtual machine hosted on a host system, a request for virtual device information about a virtual device which may inaccurately represent to the guest system a state of a physical storage device connected to the host system, (2) a gathering module programmed to gather physical device information via the host system about the physical storage device connected to the host system, (3) a determination module programmed to determine a mapping of the virtual device within the guest system to the physical storage device connected to the host system, (4) a correlation module programmed to correlate the physical device information with the mapping to determine accurate information about the virtual device, (5) a sending module programmed to send the accurate information about the virtual device from the host system to the guest system within the virtual machine and (6) at least one processor configured to execute the receiving module, the gathering module, the determination module, the correlation module and the sending module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) receive, from a guest system within a virtual machine hosted on a host system, a request for virtual device information about a virtual device which may inaccurately represent to the guest system a state of a physical storage device connected to the host system, (2) gather physical device information via the host system about the physical storage device connected to the host system, (3) determine a mapping of the virtual device within the guest system to the physical storage device connected to the host system, (4) correlate the physical device information with the mapping to determine accurate information about the virtual device and (5) send the accurate information about the virtual device from the host system to the guest system within the virtual machine.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for sending information to guest systems within virtual machines. As will be explained in greater detail below, by gathering physical storage device information via a host system and sending it to a guest system, the guest system may receive far more accurate information than otherwise. This may allow the guest system to make better decisions about which actions to take. For example, the guest system may have more accurate information about which physical storage devices are may be fully functional, and may make better decisions about which physical storage devices to use.

The following will provide, with reference to FIGS. 1-2, 4 and 5, detailed descriptions of exemplary systems for sending information to guest systems within virtual machines. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

Figure 1:
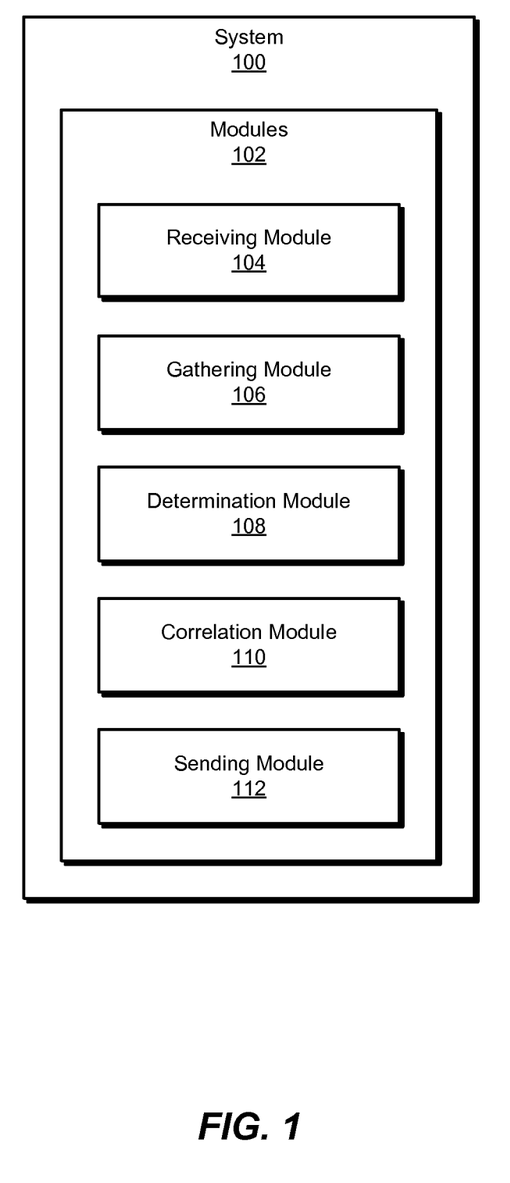
FIG. 1 is a block diagram of an exemplary system for sending information to guest systems within virtual machines.

FIG. 1 is a block diagram of exemplary system 100 for sending information to guest systems within virtual machines. As illustrated in this figure, exemplary system 100 may include one or more modules 102 for performing one or more tasks. For example, and as will be explained in greater detail below, exemplary system 100 may include a receiving module 104 programmed to receive, from a guest system within a virtual machine hosted on a host system, a request for virtual device information about a virtual device which may inaccurately represent to the guest system a state of a physical storage device connected to the host system. Exemplary system 100 may additionally include a gathering module 106 programmed to gather physical device information via the host system about the physical storage device connected to the host system. Exemplary system 100 may also include a determination module 108 programmed to determine a mapping of the virtual device within the guest system to the physical storage device connected to the host system. Exemplary system 100 may additionally include a correlation module 110 programmed to correlate the physical device information with the mapping to determine accurate information about the virtual device. Exemplary system 100 may also include a sending module 112 programmed to send the accurate information about the virtual device from the host system to the guest system within the virtual machine. Exemplary system 100 may also include at least one processor configured to execute the receiving module, the gathering module, the determination module, the correlation module and the sending module. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Figure 2:
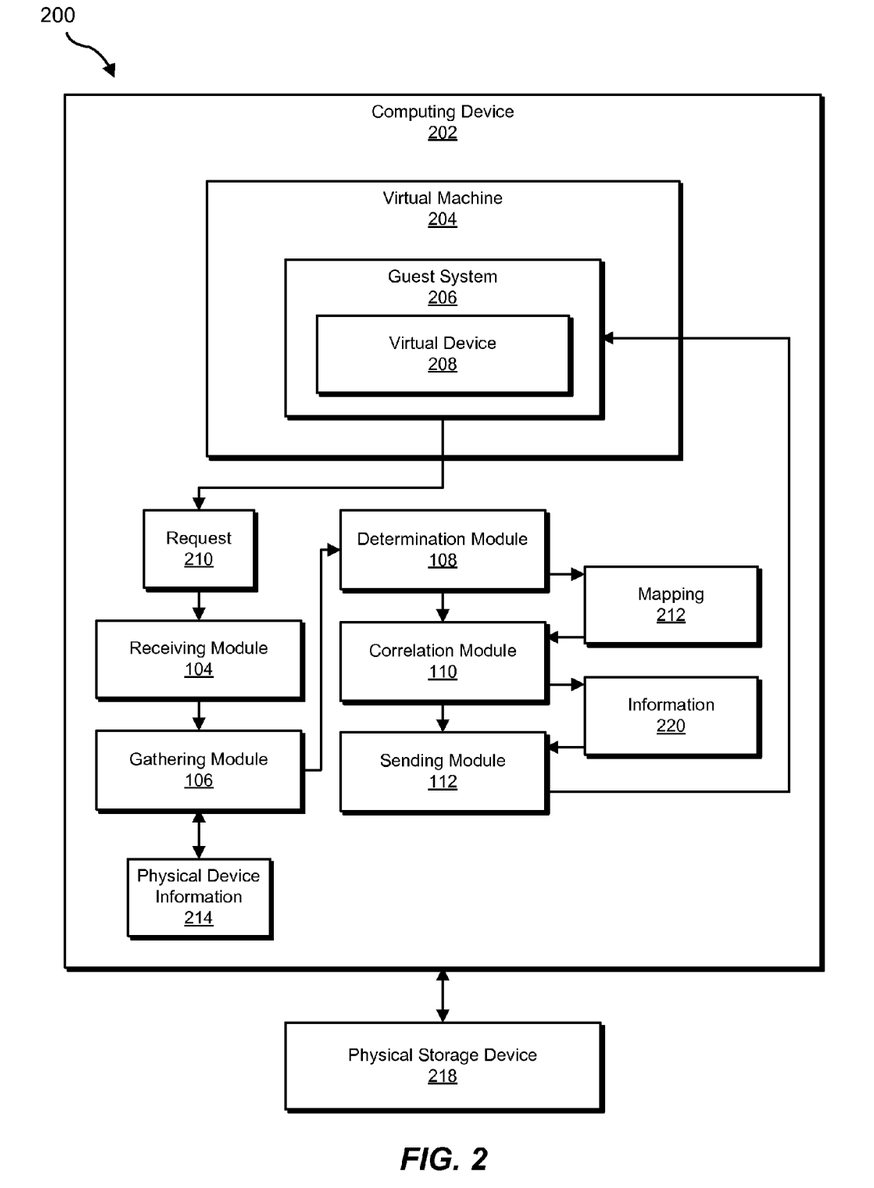
FIG. 2 is a block diagram of an exemplary system for sending information to guest systems within virtual machines.

In one embodiment, one or more of modules 102 from FIG. 1 may, when executed by at least one processor of computing device 202, facilitate computing device 202 in sending information to guest systems within virtual machines. For example, and as will be described in greater detail below, one or more of modules 102 may cause computing device 202 to sending information to guest systems within virtual machines. For example, and as will be described in greater detail below, receiving module 104 may be programmed to receive, from a guest system 206 within a virtual machine 204 hosted on computing device 202, a request 210 for virtual device information about a virtual device 208 which may inaccurately represent to guest system 206 a state of a physical storage device 218 connected to computing device 202. Gathering module 106 may be programmed to gather physical device information 214 via computing device 202 about physical storage device 218 connected to computing device 202. Determination module 108 may be programmed to determine a mapping 212 of virtual device 208 within guest system 206 to physical storage device 218 connected to computing device 202. Correlation module 110 may be programmed to correlate physical device information 214 with mapping 212 to determine information 220 about virtual device 208. Sending module 112 may be programmed to send information 220 about virtual device 208 from computing device 202 to guest system 206 within virtual machine 204.

Computing device 202 generally represents any type or form of computing device capable of reading computer-executable instructions. Examples of computing device 202 include, without limitation, virtual machines, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Figure 3:
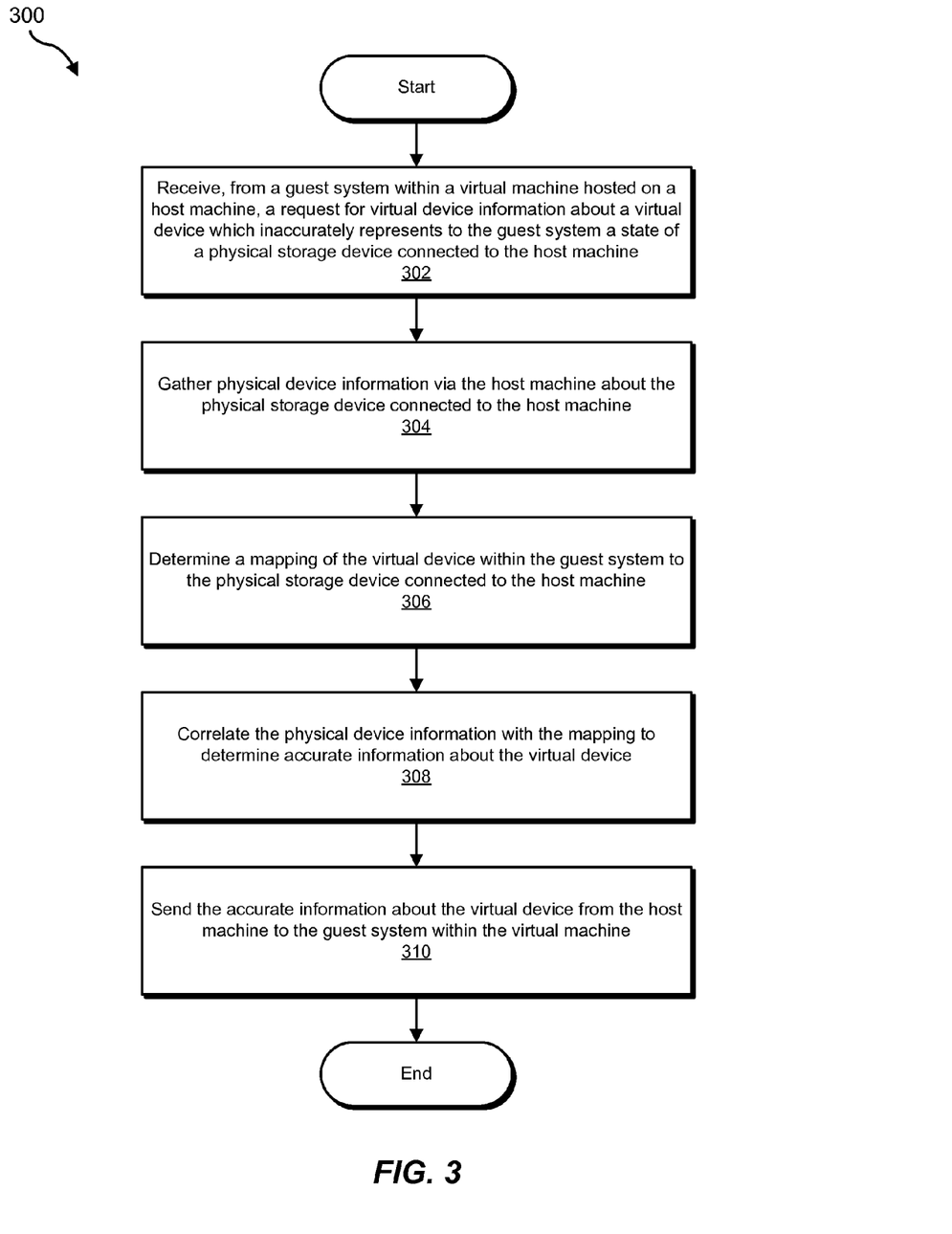
FIG. 3 is a flow diagram of an exemplary method for sending information to guest systems within virtual machines.

FIG. 3 is a flow diagram of an exemplary computer-implemented method 300 for sending information to guest systems within virtual machines. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may receive, from a guest system within a virtual machine hosted on a host system, a request for virtual device information about a virtual device which may inaccurately represent to the guest system a state of a physical storage device connected to the host system. For example, at step 302 receiving module 104 may, as part of computing device 202 in FIG. 2, receive, from guest system 206 within virtual machine 204 hosted on computing device 202, a request 210 for virtual device 208 information about virtual device 208 which inaccurately represents to guest system 206 a state of physical storage device 218 connected to computing device 202.

As used herein, the phrase "virtual machine" generally refers to a computing system platform that may not have direct correspondence to hardware of an underlying host machine. For example, hardware of a host system may be abstracted to a virtual machine using a hypervisor or other virtualization software. A virtual machine may run a guest operating system and/or various other software applications. Examples may include a system virtual machine running an operating system including systems such as WINDOWS XP, MAC OS, DEBAIN LINUX and/or IBM-AIX, and/or a process virtual machine designed to support a single process including processes such as the JAVA VIRTUAL MACHINE and/or the .NET FRAMEWORK.

The phrase "virtual device" as used herein generally refers to any virtualized and/or simulated representation of a physical device. Examples may include a Virtual Machine Disk (VMDK), Small Computer System Interface (SCSI) virtualizations, EMC VPLEX, and/or file systems.

As used herein, the term "request" generally refers to any attempt by a guest system to acquire information about a virtual device. In some examples, the request may include an attempt by the guest system to access, probe, and/or retrieve information from a virtual device. In these examples, receiving module 104 may receive the request by intercepting the request. For example, receiving module 104 may (e.g., as a part of the host system) identify an attempt by the guest system to probe the virtual device and intercept the attempt (e.g., in order to supply a response to the probe that accurately represents a state of an underlying physical device). Additionally or alternatively, the request may include a communication from the guest system targeted to the host system (e.g., through an established guest-host communication channel and/or application programming interface). In some examples, the request may originate directly from an application on the guest system.

Receiving module 104 may receive the request in any of a variety of contexts. For example, the guest system may include a dynamic multipathing system that requests information about one or more devices in order to select an I/O path. As will be explained in greater detail below, the systems and methods described herein may facilitate a correct and/or optimal selection of an I/O path by providing accurate information to the dynamic multipathing system.

In some embodiments, receiving module 104 may receive the request for the virtual device information by receiving a probing policy from the guest system that configures the host to periodically gather updated information about the physical storage device, and gathering the physical device information may include gathering the physical device information according to the probing policy. Examples of a probing policy may include, "retrieve device information every hour," "retrieve device information every time a device is updated," and/or "retrieve a certain subset of device information every ten minutes." One example of a probing policy is a restore daemon policy, which may be configured to probe input/output paths on recurring basis.

The phrase "host system" as used herein generally refers to any system which hosts a virtual machine. Examples may include physical devices and/or virtual machines. In some examples, a host system may include an I/O domain configured to manage one or more hardware devices and/or create an abstraction of one or more hardware devices. In some examples, the host system may expose individual files to the guest system as devices.

The virtual device information that guest system 206 may request may include any of a variety of information. For example, the virtual device information may include device property information (e.g., native capabilities of devices such as replication, redundant storage, etc.), device connect and/or disconnect events, and/or device error types.

In some examples, virtual device 208 may inaccurately represent the state of physical storage device 218 by representing an input/output path to physical storage device 218 as available when the input/output path to physical storage device 218 may be unavailable. In some examples, the physical storage device may have been disconnected but the virtual device may inaccurately represent the physical storage device as connected. In some examples, the physical storage device may be suffering from connectivity problems within the input/output path of which the virtual device may be unaware. In these examples, if the guest system were aware of the connectivity problem it may be able to overcome the problem by using a different input/output path.

In some examples, an application within a virtual machine running an operating system may attempt to write some data to a disk. The write attempt to the physical disk may fail with a generic error message, which may cause the virtual machine to represent the virtual disk as completely non-functional when in fact the physical disk may be partially functional. The application may make a request for information about the specific error affecting the disk, and the request may be received by an agent on the host system.

Figure 4:
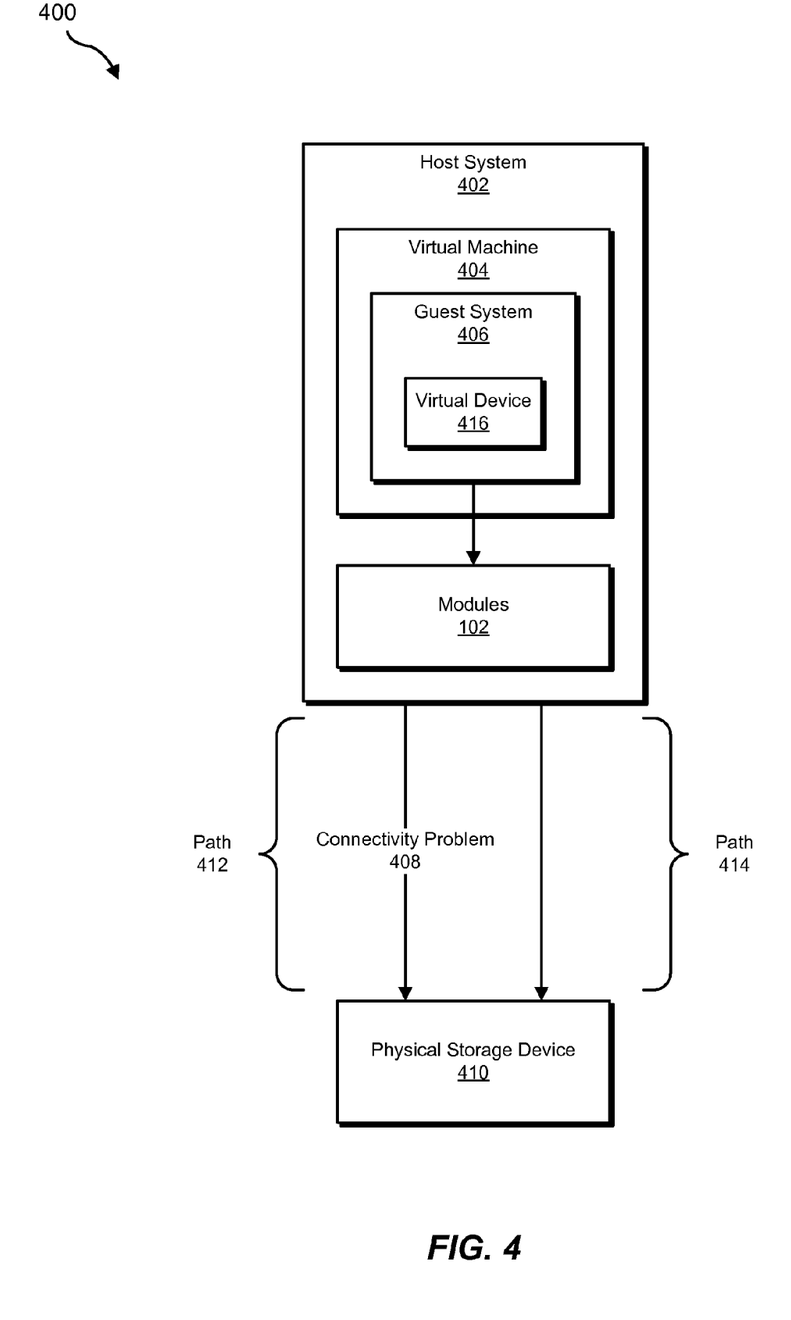
FIG. 4 is a block diagram of an exemplary system for sending information to guest systems within virtual machines.

For example, as illustrated in FIG. 4, host system 402 may be connected to physical storage device 410 by both path 412 and path 414. Path 412 may be suffering from connectivity problem 408. In some examples, virtual device 416 may represent physical storage device 410 as being unavailable because guest system 406 may only be aware of path 412. However, physical storage device 410 may be available, because it may also be connected by path 414, which may not be affected by the connectivity problem.

As used herein, the phrase "connectivity problem" generally refers to any error that may interfere with, degrade, slow down, and/or prevent a data transfer via an input/output path. Some examples of connectivity problems may include a controller failure, a port failure, a cable failure, and/or a switch failure. In some examples, the phrase "connectivity problem" may refer to an unreliable connection, a connection with too little available bandwidth, and/or a connection with too few available paths.

In some examples, virtual device 208 may inaccurately represent the state of physical storage device 218 by representing physical storage device 218 as affected by a media error when physical storage device 218 may not be affected by a media error but guest system 206 may affected by a connectivity problem with physical storage device 218.

For example, as illustrated in FIG. 4, guest system 406 may send a request to physical storage device 410 via path 412 and encounter connectivity problem 418. Because guest system 406 may not receive information from host system 402 about the nature of the error, merely that the error has occurred, guest system 406 may inaccurately conclude that physical storage device 410 may be affected by a media error. A media error cannot be solved by using a different path, so guest system 406 may not even attempt to use path 414. This may lead to the guest system making suboptimal decisions based on the inaccurate information that the physical storage device is unavailable.

As used herein, the phrase "media error" generally refers to any error rendering a physical storage device unreadable. Some examples include device disconnects, hard drive head crashes, and/or physical disk degradation.

Returning to FIG. 3, at step 304 one or more of the systems described herein may gather physical device information via the host system about the physical storage device connected to the host system. For example, at step 304 gathering module 106 may, as part of computing device 202 in FIG. 2, gather physical device information 214 via computing device 202 about physical storage device 218 connected to computing device 202.

For example, gathering module 106 may gather input/output path status information about the physical storage device and discover that one of the input/output paths may be affected by a connectivity problem, but that there are other input/output paths which may not be affected by connectivity problems.

As used herein, the phrase "physical storage device" generally refers to any non-virtual device used to store data and/or facilitate the storage of data. Some examples may include logical disks also known as logical units, RAID systems, storage area networks (SANs) and/or devices connected to SANs, hard drives, and/or solid-state drives. Physical storage devices may be connected to host systems in any number of ways including fibre channels, SCSI chains, and/or networks.

In some examples, the physical device information about the physical storage device may include (1) a media type of the physical storage device, (2) a logical unit type provided by the physical storage device, (3) a native capability of the physical storage device, and/or (4) path availability information about a connection between the physical storage device and the guest system.

At step 306 one or more of the systems described herein may determine a mapping of the virtual device within the guest system to the physical storage device connected to the host system. For example, at step 306 determination module 108 may, as part of computing device 202 in FIG. 2, determine a mapping 212 of virtual device 208 within guest system 206 to physical storage device 218 connected to computing device 202.

For example, determination module 108 may determine that the physical disk connected to the host system may be represented by a specific virtual disk within the guest system on the virtual machine. The mapping may include a mapping of one or more virtual devices to one or more physical devices. Additionally or alternatively, the mapping may include a mapping of one or more virtual devices to one or more logical units of storage (e.g., to one or more files).

At step 308 one or more of the systems described herein may correlate the physical device information with the mapping to determine accurate information about the virtual device. For example, at step 308 correlation module 110 may, as part of computing device 202 in FIG. 2, correlate physical device information 214 with mapping 212 to determine information 220 about virtual device 208.

For example, correlation module 110 may correlate information that there is a connectivity problem with one input/output path to the physical disk but not with other input/output paths with the mapping from the physical disk to the specific virtual disk to determine that the specific virtual disk is functional and reachable.

In some examples, the accurate information about the virtual device may indicate a connectivity problem between the guest system and the physical storage device. In these examples, the computer-implemented method may further include moving, in response to the connectivity problem, the guest system to a different host system connected to the physical storage device that may not have the connectivity problem.

Figure 5:
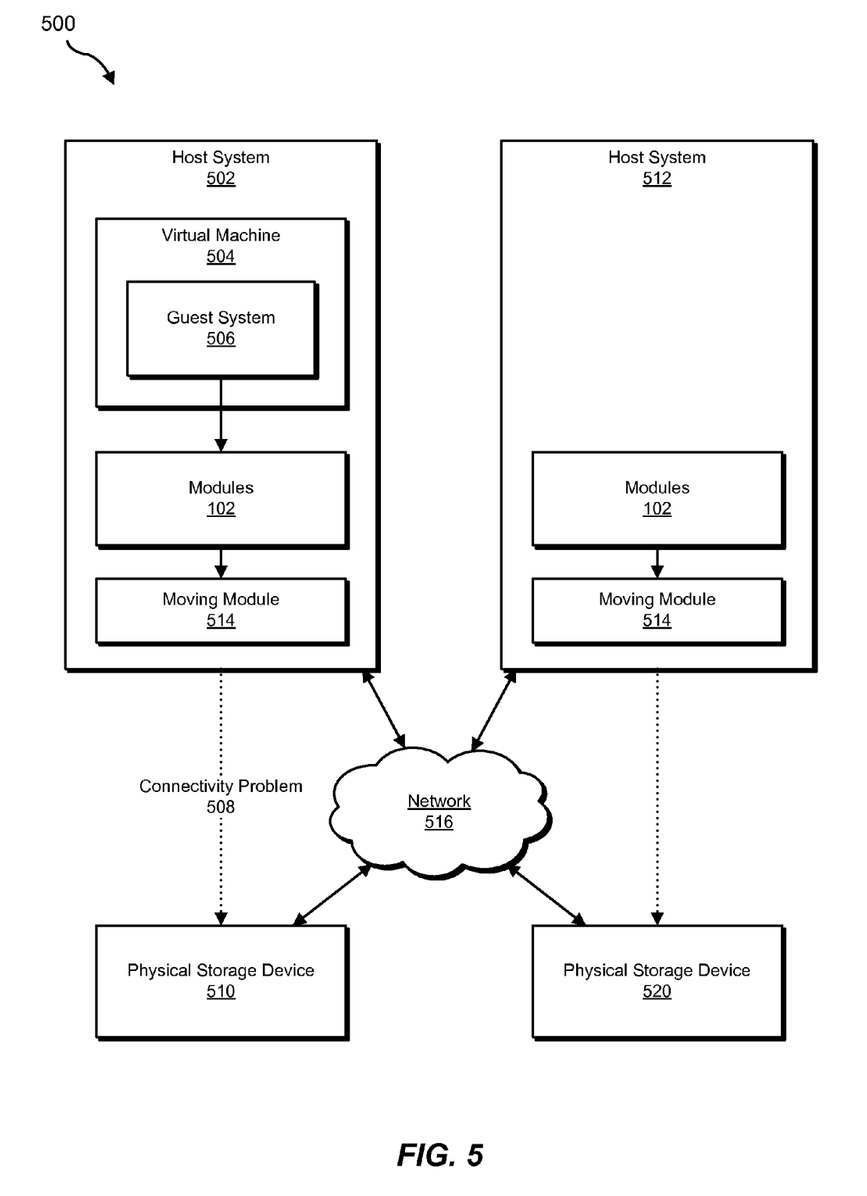
FIG. 5 is a block diagram of an exemplary system for sending information to guest systems within virtual machines.

For example, as illustrated in FIG. 5, host system 502 may be connected to physical storage device 510 via network 516. The path between host system 502 and physical storage device 510 may be affected by connectivity problem 508. Host system 512 may also be connected to network 516, and may not be experiencing a connectivity problem with physical storage device 510. Moving module 514 may move guest system 506 to host system 512. In some embodiments, this may be accomplished by moving the entirety of virtual machine 504. In some embodiments, this may include using systems such as VMWARE HIGH AVAILABILITY (VMHA) and/or VMWARE STORAGE VMOTION.

Network 516 generally represents any medium or architecture capable of facilitating communication or data transfer. Examples of network 516 include, without limitation, an intranet, a Wide Area Network (WAN), a Local Area Network (LAN), a Storage Area Network (SAN), a Personal Area Network (PAN), the Internet, Power Line Communications (PLC), a cellular network (e.g., a Global System for Mobile Communications (GSM) network), exemplary network architecture 700 in FIG. 7, or the like. Network 516 may facilitate communication or data transfer using wireless or wired connections. In one embodiment, network 516 may facilitate communication between computing host system 502, host system 512, physical storage device 510 and/or physical storage device 520.

In some examples, the accurate information about the virtual device may indicate a media failure of the physical storage device. In these examples, the computer-implemented method may further include moving, in response to the media failure, the guest system to a different host system connected to a different physical storage device which may replicate the physical storage device affected by the media failure.

For example, as illustrated in FIG. 5, host system 502 may be connected to physical storage device 510 via network 516. Host system 512 may be connected to physical storage device 520, and both of these may also be connected to network 516. Physical storage device 520 may replicate physical storage device 510. Moving module 514 may move guest system 506 to host system 512. In some embodiments, moving module 514 may move the guest system to the host system by moving the entirety of virtual machine 504. In some embodiments, this may include using a site recovery manager (SRM).

Returning to FIG. 3, at step 310 one or more of the systems described herein may send the accurate information about the virtual device from the host system to the guest system within the virtual machine. For example, at step 310 sending module 112 may, as part of computing device 202 in FIG. 2, send information 220 about virtual device 208 from computing device 202 to guest system 206 within virtual machine 204.

For example, sending module 112 may send the information that the specific virtual disk is functional and reachable to the application within the virtual machine. In this example, the guest system may repeat its original action to write data to the disk, this time using an input/output path not affected by the connectivity problem. Other examples of actions the guest system may take may include modifying the original action, abandoning the original action, displaying information to the user, sending a new request for information, sending a request for a new action, and/or repeating the original action without modification.

In some examples, the computer-implemented method may further include receiving, in response to sending the accurate information, a request from the guest system requesting that the guest system be moved to a different host system connected to the physical storage device which may not have the connectivity problem. For example, as illustrated in FIG. 5, guest system 506 may request to be moved from host system 502 to host system 512, which is not affected by connectivity problems with physical storage device 510.

In examples where the moving module may move the guest system to a different host machine, the accurate information may include information about the devices connected to the new host machine.

In some examples, the accurate information about the virtual device may indicate that the host system is not conforming to a service level specification of the guest system. For example, the guest system may have a service level specification requiring a certain level of connectivity with physical storage devices. The accurate information may indicate that current levels of connectivity are below the level specified in the service level specification. Some examples of what the level of connectivity may represent include the number of available paths, the total bandwidth of the available paths, the number of physical storage devices available, and/or the total storage capacity of the available physical storage devices.

For example, virtual machine 502 may not be conforming to a service level specification for guest system 506, because there may be insufficient bandwidth available between guest system 506 and physical storage device 510. In some examples, guest system 506 may use moving module 514 to move to host system 512, which may have connections of sufficient bandwidth to physical storage device 510 to conform to the service level specification for virtual machine 502.

As explained above in connection with method 300 in FIG. 3, a guest system within a virtual machine may make a request for information about a virtual device which may be inaccurately representing the state of a physical storage device connected to a host machine.

An agent on the host machine may gather information about the physical storage device and correlate the information with a mapping of the physical storage device to the virtual device to determine accurate information about the virtual device. The agent may send the accurate information to the guest system, allowing the guest system to make more accurate decisions.

Figure 6:
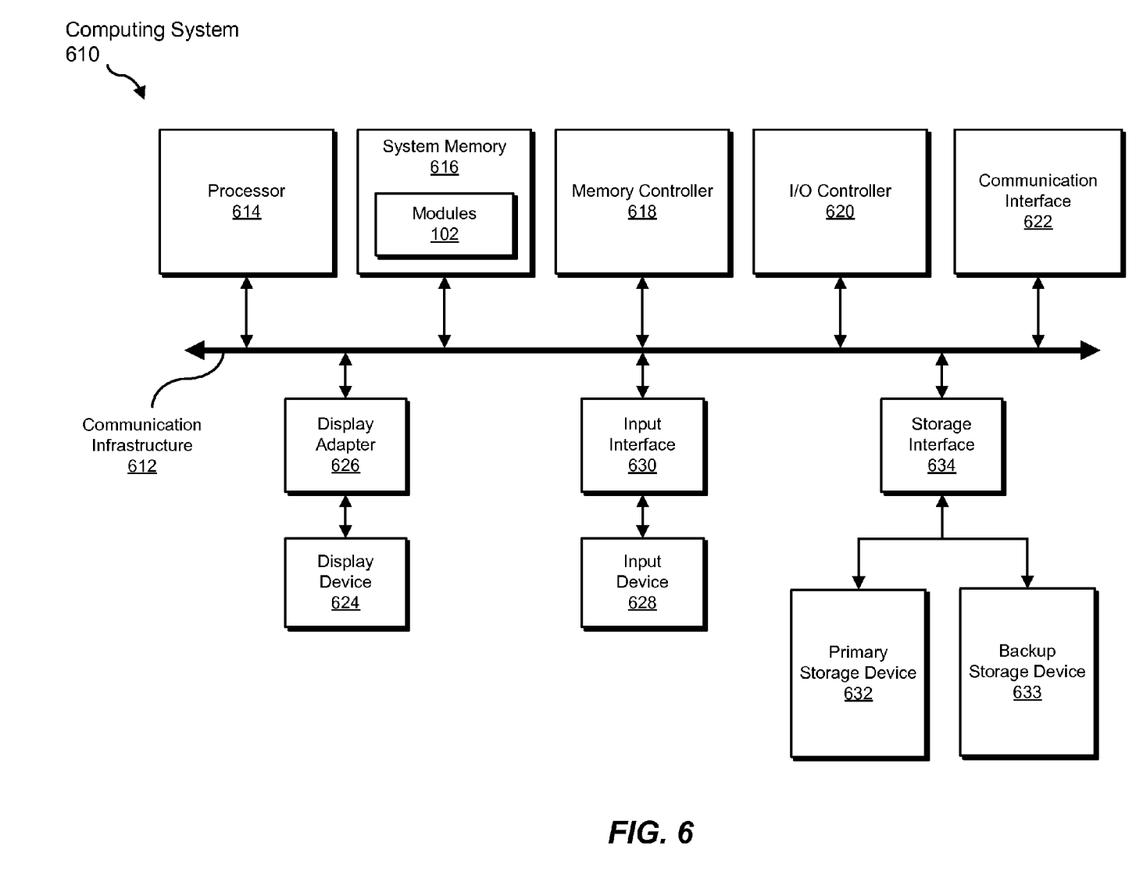
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the receiving, gathering, determining, correlating and/or sending steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
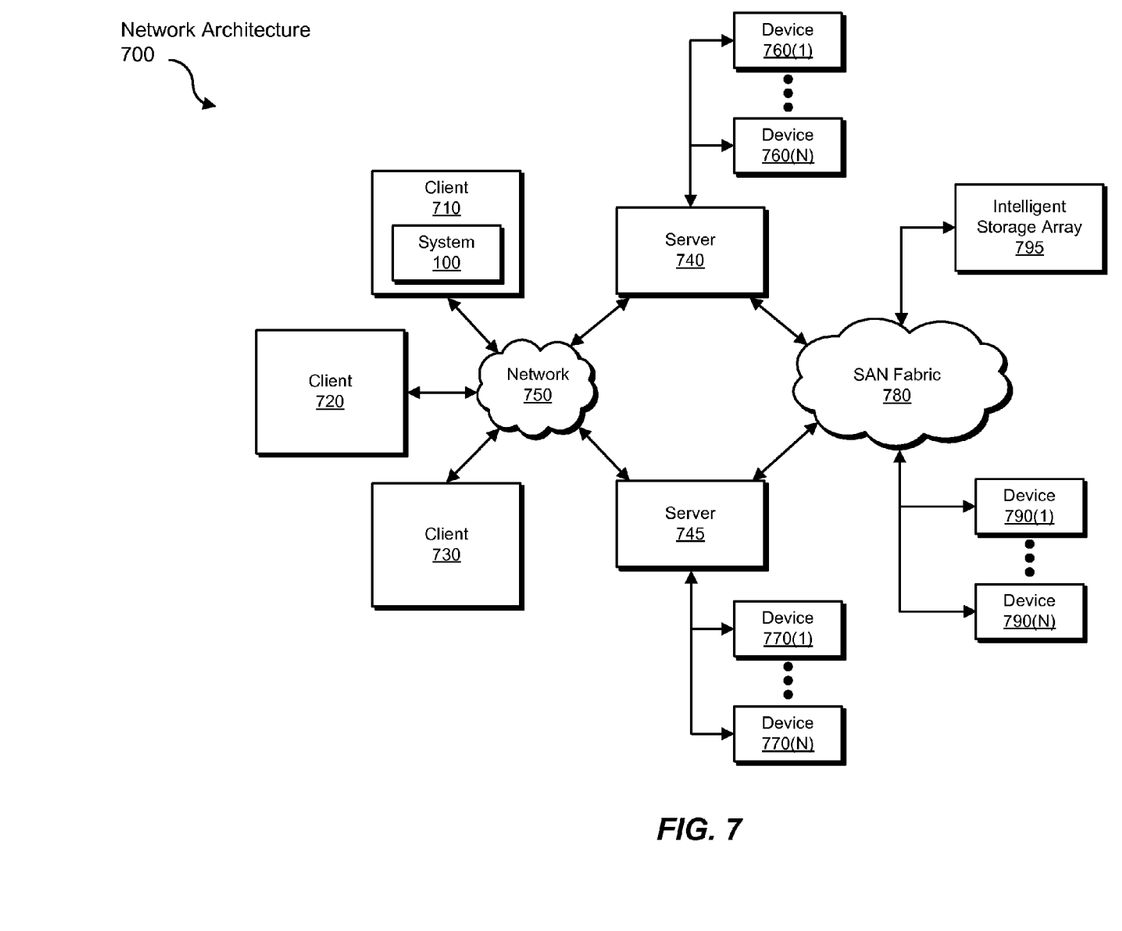
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the receiving, gathering, determining, correlating and/or sending steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for sending information to guest systems within virtual machines.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive physical device information to be transformed, transform the physical device information, output a result of the transformation to a correlation module, use the result of the transformation to determine virtual device information, and store the result of the transformation in a guest system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for sending information to guest systems within virtual machines, at least a portion of the method being performed by a computing device comprising at least one processor, the method comprising:
    receiving, from a guest system within a virtual machine hosted on a host system, a request for virtual device information about a virtual device which inaccurately represents to the guest system a state of a physical storage device connected to the host system, wherein the request for virtual device information comprises a probing policy from the guest system that configures the host system to periodically gather updated information about the physical storage device;
    gathering physical device information according to the probing policy and via the host system about the physical storage device connected to the host system;
    determining a mapping of the virtual device within the guest system to the physical storage device connected to the host system;
    correlating the physical device information with the mapping to determine accurate information about the virtual device; and
    sending the accurate information about the virtual device from the host system to the guest system within the virtual machine.

2. The computer-implemented method of claim 1, wherein the accurate information about the virtual device indicates a connectivity problem between the guest system and the physical storage device.

3. The computer-implemented method of claim 2, further comprising moving, in response to the connectivity problem, the guest system to a different host system connected to the physical storage device that does not have the connectivity problem.

4. The computer-implemented method of claim 2, further comprising receiving, in response to sending the accurate information, a request from the guest system requesting that the guest system be moved to a different host system connected to the physical storage device which does not have the connectivity problem.

5. The computer-implemented method of claim 1, wherein the accurate information about the virtual device indicates a media failure of the physical storage device.

6. The computer-implemented method of claim 5, further comprising moving, in response to the media failure, the guest system to a different host system connected to a different physical storage device which replicates the physical storage device affected by the media failure.

7. The computer-implemented method of claim 1, wherein the physical device information about the physical storage device comprises at least one of:
    a media type of the physical storage device;
    a logical unit type provided by the physical storage device;
    a native capability of the physical storage device;
    path availability information about a connection between the physical storage device and the guest system.

8. The computer-implemented method of claim 1, wherein the virtual device inaccurately represents the state of the physical storage device by representing an input/output path to the physical storage device as available when the input/output path to the physical storage device is unavailable.

9. The computer-implemented method of claim 1, wherein the virtual device inaccurately represents the state of the physical storage device by representing the physical storage device as affected by a media error when the physical storage device is not affected by a media error but the guest system is affected by a connectivity problem with the physical storage device.

10. The computer-implemented method of claim 1, wherein the accurate information about the virtual device indicates that the host system is not conforming to a service level specification of the guest system.

11. A system for sending information to guest systems within virtual machines, the system comprising:
- a receiving module programmed to receive, from a guest system within a virtual machine hosted on a host system, a request for virtual device information about a virtual device which inaccurately represents to the guest system a state of a physical storage device connected to the host system, wherein the request for virtual device information comprises a probing policy from the guest system that configures the host system to periodically gather updated information about the physical storage device;
- a gathering module programmed to gather physical device information according to the probing policy and via the host system about the physical storage device connected to the host system;
- a determination module programmed to determine a mapping of the virtual device within the guest system to the physical storage device connected to the host system;
- a correlation module programmed to correlate the physical device information with the mapping to determine accurate information about the virtual device;
- a sending module programmed to send the accurate information about the virtual device from the host system to the guest system within the virtual machine; and
- at least one processor configured to execute the receiving module, the gathering module, the determination module, the correlation module and the sending module.

12. The system of claim 11, wherein the accurate information about the virtual device indicates a connectivity problem between the guest system and the physical storage device.

13. The system of claim 12, further comprising a moving module programmed to move, in response to the connectivity problem, the guest system to a different host system connected to the physical storage device that does not have the connectivity problem.

14. The system of claim 12, wherein the receiving module is programmed to receive, in response to sending the accurate information, a request from the guest system requesting that the guest system be moved to a different host system connected to the physical storage device which does not have the connectivity problem.

15. The system of claim 11, wherein the accurate information about the virtual device indicates a media failure of the physical storage device.

16. The system of claim 15, further comprising a moving module programmed to move, in response to the media failure, the guest system to a different host system connected to a different physical storage device which replicates the physical storage device affected by the media failure.

17. The system of claim 11, wherein the physical device information about the physical storage device comprises at least one of:
- a media type of the physical storage device;
- a logical unit type provided by the physical storage device;
- a native capability of the physical storage device;
- path availability information about a connection between the physical storage device and the guest system.

18. A non-transitory computer-readable-storage medium comprising one or more computer-readable instructions that, when executed by at least one processor of a computing device, cause the computing device to:
- receive, from a guest system within a virtual machine hosted on a host system, a request for virtual device information about a virtual device which inaccurately represents to the guest system a state of a physical storage device connected to the host system, wherein the request for virtual device information comprises a probing policy from the guest system that configures the host system to periodically gather updated information about the physical storage device;
- gather physical device information according to the probing policy and via the host system about the physical storage device connected to the host system;
- determine a mapping of the virtual device within the guest system to the physical storage device connected to the host system;
- correlate the physical device information with the mapping to determine accurate information about the virtual device; and
- send the accurate information about the virtual device from the host system to the guest system within the virtual machine.

* * * * *